United States Patent

[11] 3,526,261

[72] Inventor Alphonso Lynn Ivey, Jr.
 111 Tuckahoe Blvd., Richmond, Virginia 23226
[21] Appl. No. 750,299
[22] Filed Aug. 5, 1968
[45] Patented Sept. 1, 1970

[54] LEAF PULVERIZING DEVICE
 3 Claims, 2 Drawing Figs.
[52] U.S. Cl................................................ 146/107,
 241/55, 230/132
[51] Int. Cl......................................... B02c 18/10
[50] Field of Search........................................ 146/107(L);
 241/101, 55, 56; 56/25.4; 103/(Inquired);
 103/111.1; 230/132; 209/(Inquired), 133(T)

[56] References Cited
 UNITED STATES PATENTS
| | | | |
|---|---|---|---|
| 2,242,922 | 5/1941 | Poynter.................... | 56/25.4X |
| 2,712,211 | 7/1955 | Smith et al................ | 56/25.4X |
| 2,931,157 | 4/1960 | Smith et al................ | 56/25.4 |

*Primary Examiner*—Andrew R. Juhasz
*Assistant Examiner*—Z. R. Bilinsky

ABSTRACT: A device in which tree leaves are placed so that they may be drawn upwards by a differential in pressure to a lawn mower blade of a lawn mower placed on the top of the device, the lawn mower blade serving to pulverize and expel the leaves in a pile alongside the device.

Patented Sept. 1, 1970

3,526,261

INVENTOR.

Alphonso Lynn Ivey, Jr.

LEAF PULVERIZING DEVICE

This invention relates to pulverizing devices and more particularly to a device for pulverizing leaves.

It is therefore the main purpose of this invention to provide a leaf pulverizing device which will consist of a truncated pyramid shaped platform in which the leaves are placed through an opening at the top.

Another object of this invention is to provide a leaf pulverizing device, the platform of which has a plurality of recessed openings for positioning the wheels of a lawn mower placed on the top of the platform, the lawn mower providing the power for pulverizing the leaves and drawing the leaves upwards into the blades of the lawn mower to be pulverized, after which the pulverized leaves are exited through an opening through the side of the lawn mower so that they will fall in a pile.

A further object of this invention is to provide a leaf pulverizing device which will prevent having to burn leaves and will produce less contamination of air.

Other objects of this invention are to provide a leaf pulverizing device which is simple in design, inexpensive to manufacture, rugged in construction, easy to use and efficient in operation.

These and other objects will become readily apparent upon a study of the following specifications together with the accompanying drawing wherein.

Figure 1:
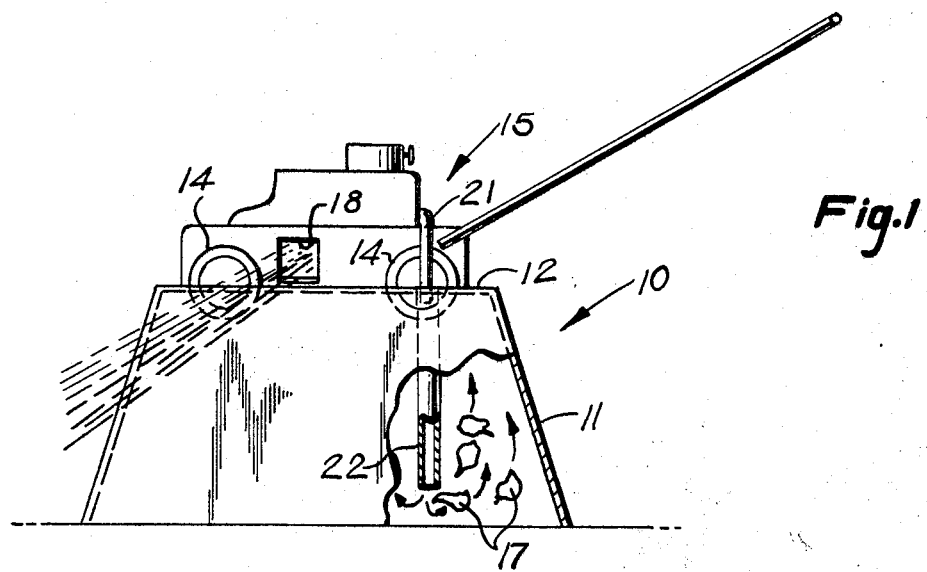
FIG. 1 is a side view of the present invention shown in use.
Figure 2:
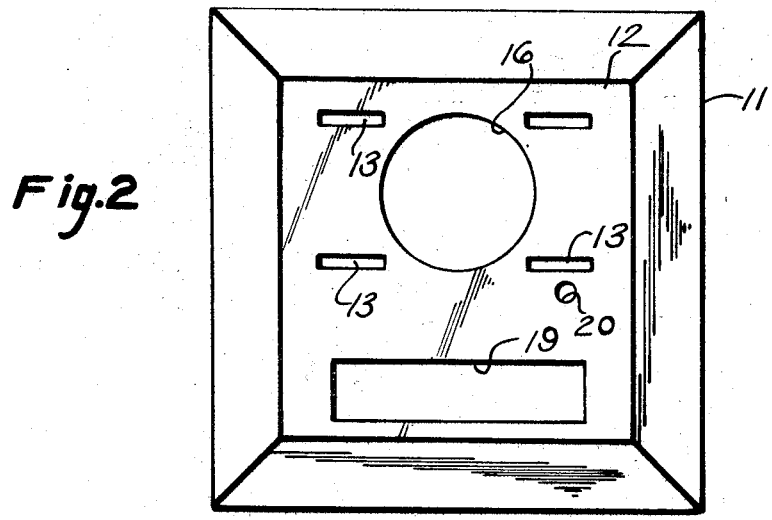
FIG. 2 is a top plan view of the device showing the lawn mower removed therefrom.

According to this invention, a leaf pulverizing device 10 is composed of a truncated pyramid shaped platform 11 of hollow configuration. Platform 11 is provided with a top surface 12 which has a plurality of spaced apart openings 13 for receiving the wheels 14 of a lawn mower 15. And openings 16 through surface 12 allows for the leaves 17 within platform 11 to be drawn upwards into the blade (not shown) of lawn mower 15 in order to be pulverized and expelled from lawn mower 15. As the leaves 18 are pulverized they are exited from opening 18 of lawn mower 15 and will pile up alongside platform 11.

A rectangular opening 19 through surface 12 allows for the placement of leaves 17 into the interior of platform 11.

When the blade (not shown) of lawn mower 15 is of the proper design, it will create sufficient suction by differential in pressure to raise leaves 17 upwards through opening 16 in order that they may be pulverized by the lawn mower 15.

If desired, opening 20 of top surface 12 of platform 11 may be utilized by extending exhaust pipe 21 into sleeve 22 which will further agitate leaves 17 so that they will raise upwards and be drawn through opening 16 into lawn mower 15.

It shall be noted that the use of the exhaust of pipe 21 is not necessary when the proper blade is used in lawn mower 15 as the proper blade will create sufficient vacuum to raise leaves 17 so that they may be pulverized by lawn mower 15.

I claim:

1. A leaf pulverizing device comprising a hollow truncated pyramid shaped platform having in its top side a rectangular intake opening, a circular opening and spaced apart openings placed symmetrically about said circular opening, a lawn mower having a power driven rotary blade positioned upon said platform, said blade providing means of creating suction within said platform for raising tree leaves from the interior of said platform into the blade of said lawn mower in order to pulverize them.

2. The combination according to claim 1, wherein said lawn mower is placed on the top surface of said platform in such a manner as to rotate the wheels of said lawn mower within the spaced apart openings of said top surface of said platform, thus aligning the blade of said lawn mower with the opening of circular configuration in order that leaves when placed through the rectangular opening through said platform will be sucked up into said blade and be pulverized by said blade of said lawn mower.

3. The combination according to claim 2 wherein said lawn mower when started will create a suction by its blade over the circular opening of said platform, said suction creating an upward movement of said leaves, thus the suction drawing said leaves into the blade of said lawn mower whereupon the blade will pulverize said leaves and expel said leaves in pulverized form from an opening in the side of said lawn mower.